(12) United States Patent
Pap et al.

(10) Patent No.: US 12,066,095 B2
(45) Date of Patent: Aug. 20, 2024

(54) MECHANICAL REDUCER FOR AN AIRCRAFT TURBOMACHINE

(71) Applicant: SAFRAN TRANSMISSION SYSTEMS, Colombes (FR)

(72) Inventors: Balint Pap, Moissy-Cramayel (FR); Clement Jarroux, Moissy-Cramayel (FR); Pierre Gilbert Claude Medecin, Moissy-Cramayel (FR); Guillaume Pierre Mouly, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/177,988

(22) Filed: Mar. 3, 2023

(65) Prior Publication Data

US 2024/0151303 A1  May 9, 2024

(30) Foreign Application Priority Data

Mar. 10, 2022  (FR) ..................................... 2202118

(51) Int. Cl.
*F16H 57/04* (2010.01)
*F16H 57/08* (2006.01)

(52) U.S. Cl.
CPC ....... *F16H 57/0479* (2013.01); *F16H 57/043* (2013.01); *F16H 57/0471* (2013.01); *F16H 57/0482* (2013.01); *F16H 2057/085* (2013.01)

(58) Field of Classification Search
CPC ............... F16H 57/0479; F16H 57/043; F16H 57/0471; F16H 57/0482; F16H 2057/085
See application file for complete search history.

(56) References Cited

U.S. PATENT DOCUMENTS

| 9,121,491 B2 * | 9/2015 | Hancox ............... F16H 57/0486 |
| 2013/0225353 A1 | 8/2013 | Gallet et al. |
| 2018/0313404 A1 | 11/2018 | Hoelzl |

(Continued)

FOREIGN PATENT DOCUMENTS

| EP | 3093514 A1 | 11/2016 |
| EP | 3396187 A1 | 10/2018 |

(Continued)

OTHER PUBLICATIONS

Preliminary Research Report received for French Application No. 2202118, dated Sep. 22, 2022, 5 pages (1 page of French Translation Cover Sheet and 4 pages of original document).

*Primary Examiner* — Justin Holmes
(74) *Attorney, Agent, or Firm* — WOMBLE BOND DICKINSON (US) LLP

(57) ABSTRACT

A mechanical reducer for a turbomachine, in particular for an aircraft, this reducer including a sun gear, a ring gear, planet gears which are meshed with the sun gear and the ring gear, hydrodynamic bearings for guiding the planet gears in rotation, these hydrodynamic bearings being carried by a planet carrier and including cylindrical bodies which include an internal oil circulation cavity and first pipelines for conveying oil from this cavity to at least one external cylindrical surface of the body, wherein each of the cylindrical bodies further includes second oil evacuation pipelines, which are different from the first pipelines, and which extend from said at least one external cylindrical surface to at least one of the longitudinal ends of that body.

18 Claims, 11 Drawing Sheets

(56) References Cited

U.S. PATENT DOCUMENTS

| | | | |
|---|---|---|---|
| 2020/0332884 A1 | 10/2020 | Di Giovanni et al. | |
| 2021/0388769 A1 | 12/2021 | Beck et al. | |
| 2021/0388770 A1* | 12/2021 | Hrubec | F16H 57/082 |
| 2022/0252009 A1* | 8/2022 | Polly | F16H 57/0456 |

FOREIGN PATENT DOCUMENTS

| | | |
|---|---|---|
| EP | 3726097 A1 | 10/2020 |
| EP | 3922886 A1 | 12/2021 |
| FR | 2987416 A1 | 8/2013 |
| FR | 3008462 A1 | 1/2015 |
| FR | 3041054 A1 | 3/2017 |
| WO | 2010/092263 A1 | 8/2010 |

* cited by examiner

[FIG. 1]
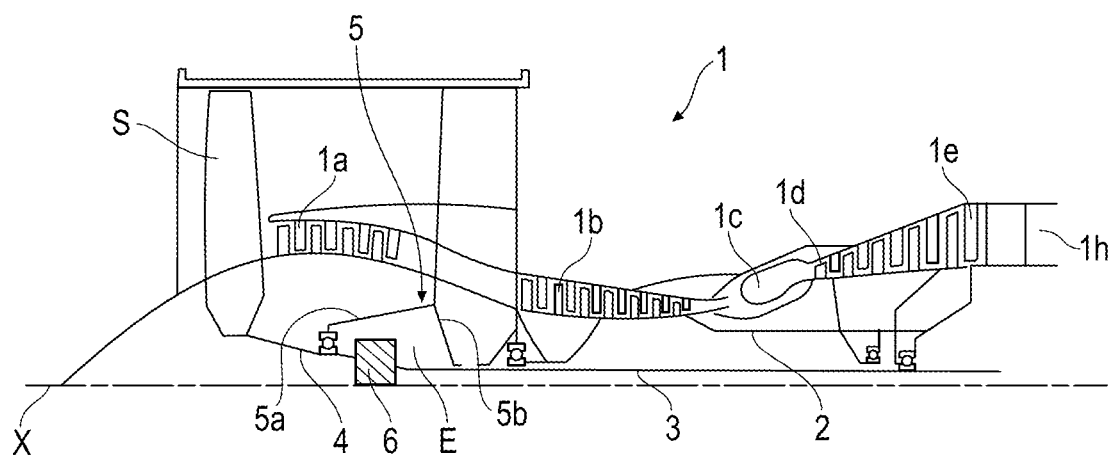

[FIG. 2]
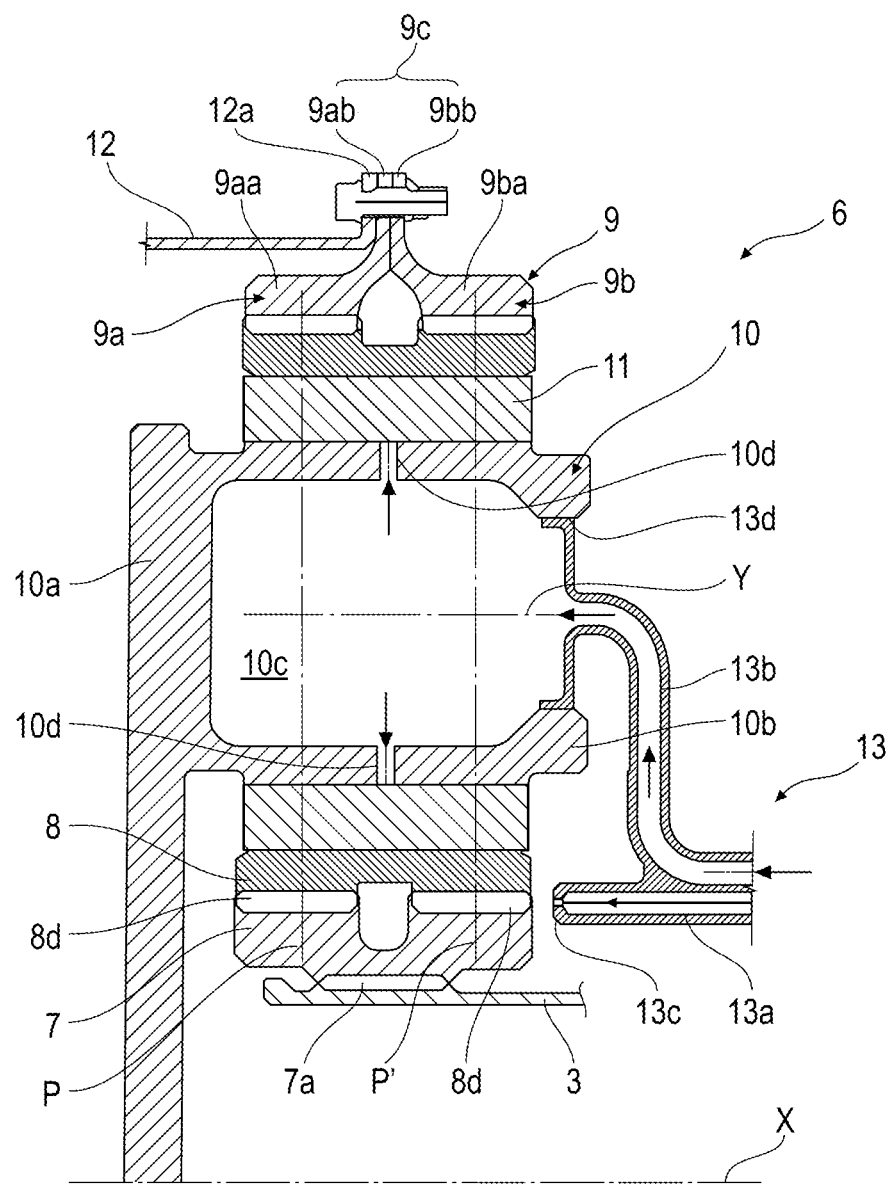

[FIG. 3]
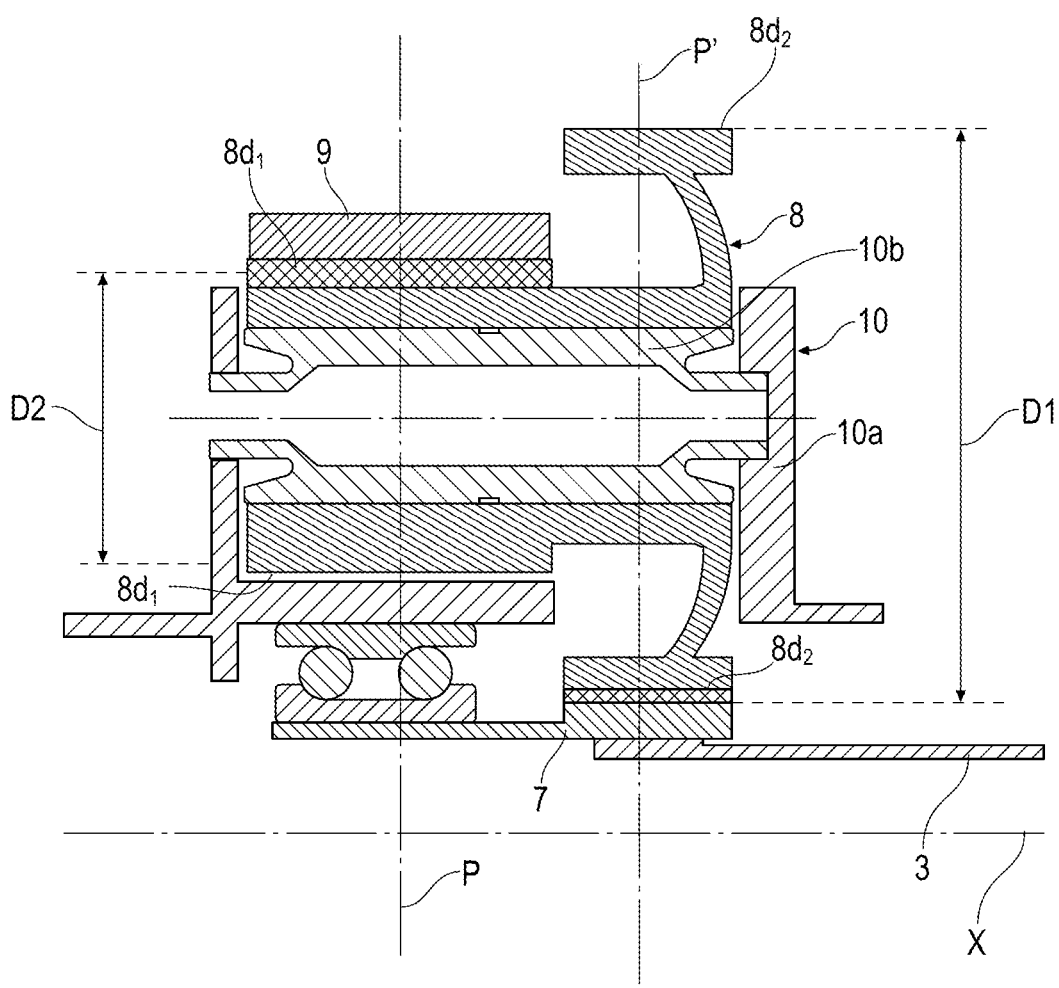

[FIG. 4]
PRIOR ART
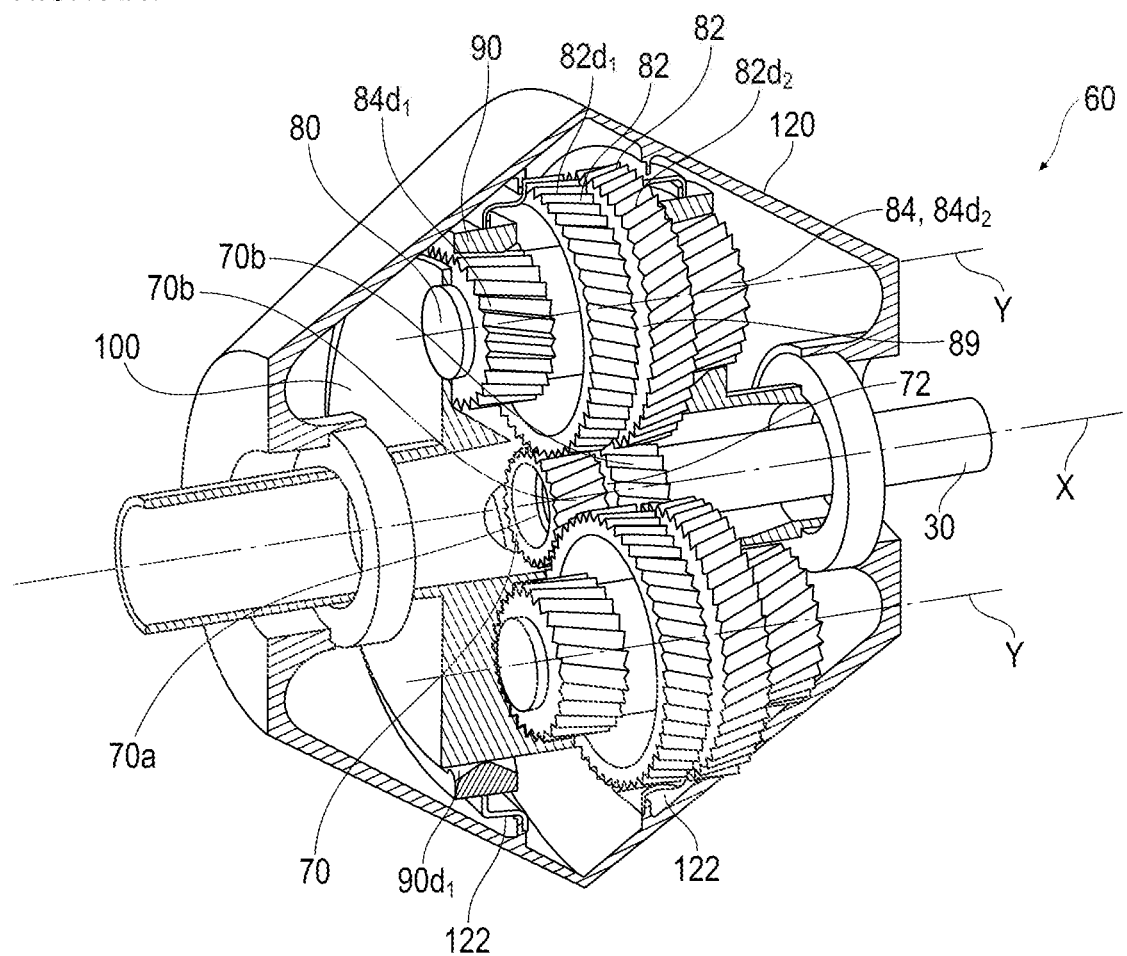

[FIG. 5]
PRIOR ART
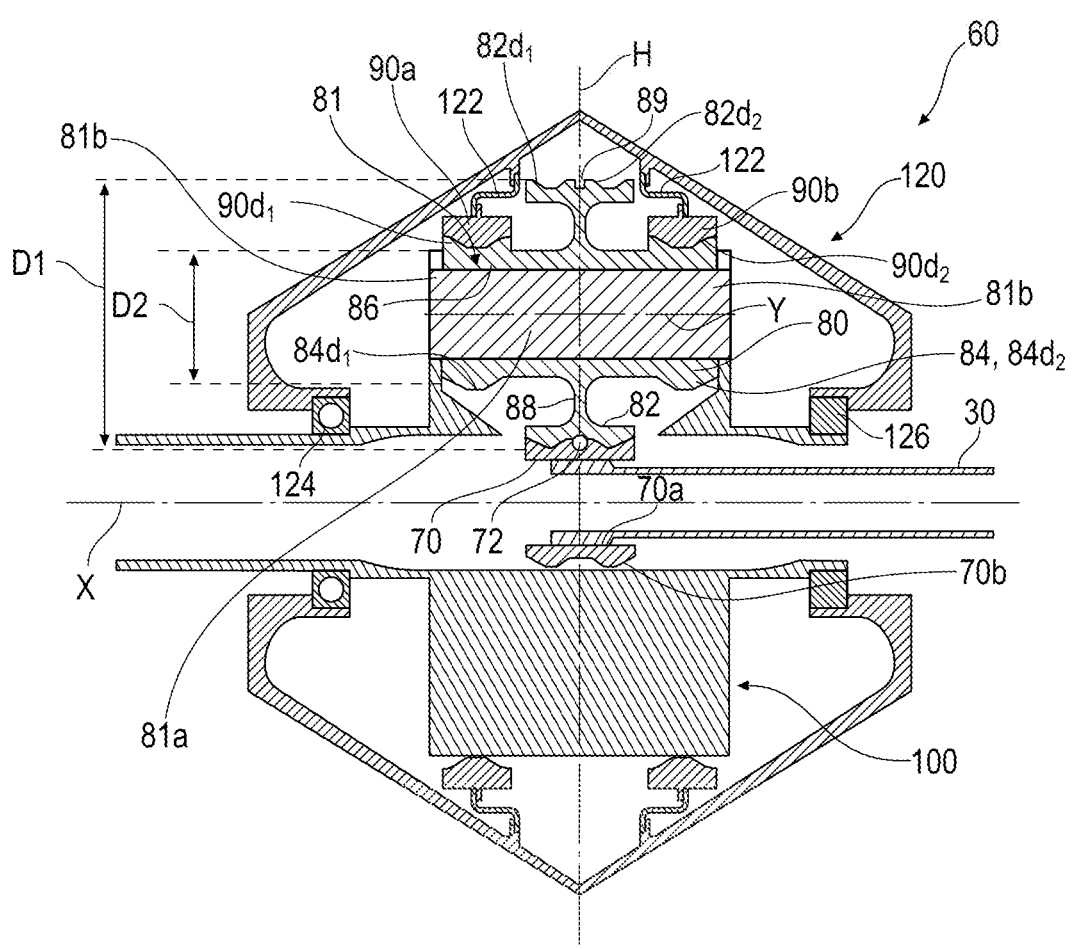

[FIG. 6]
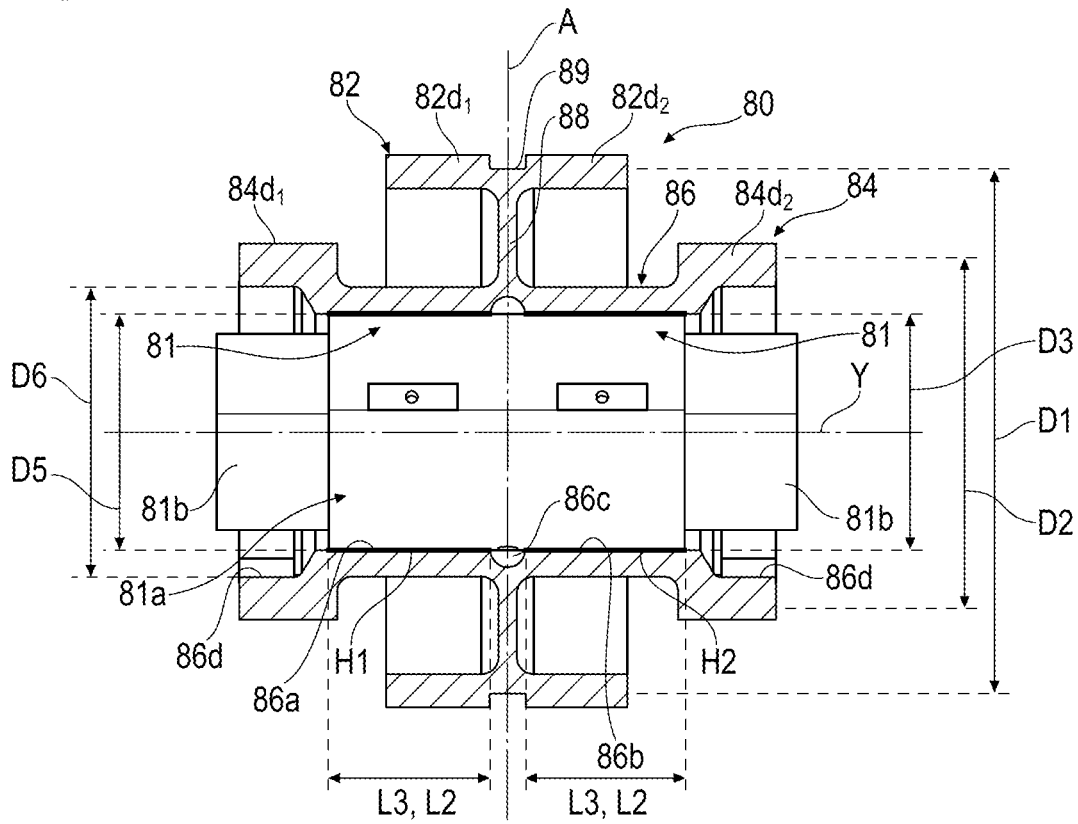
[FIG. 7]
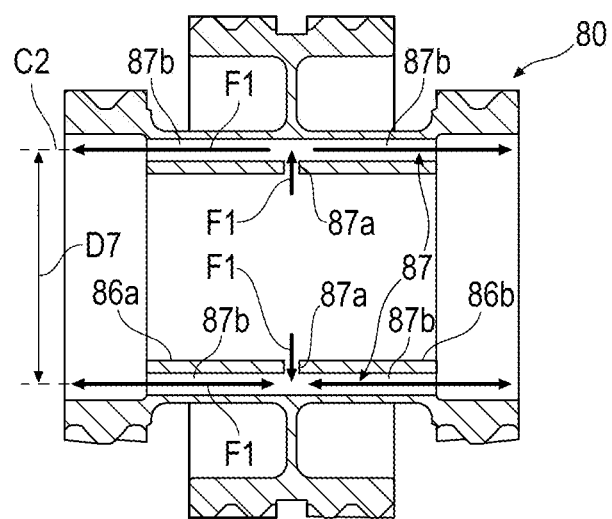

[FIG. 8]
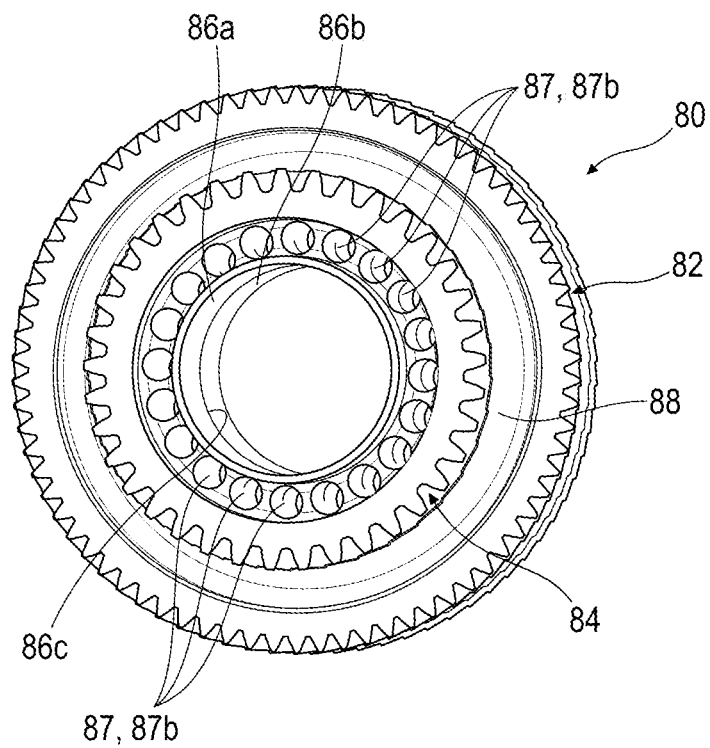
[FIG. 9]
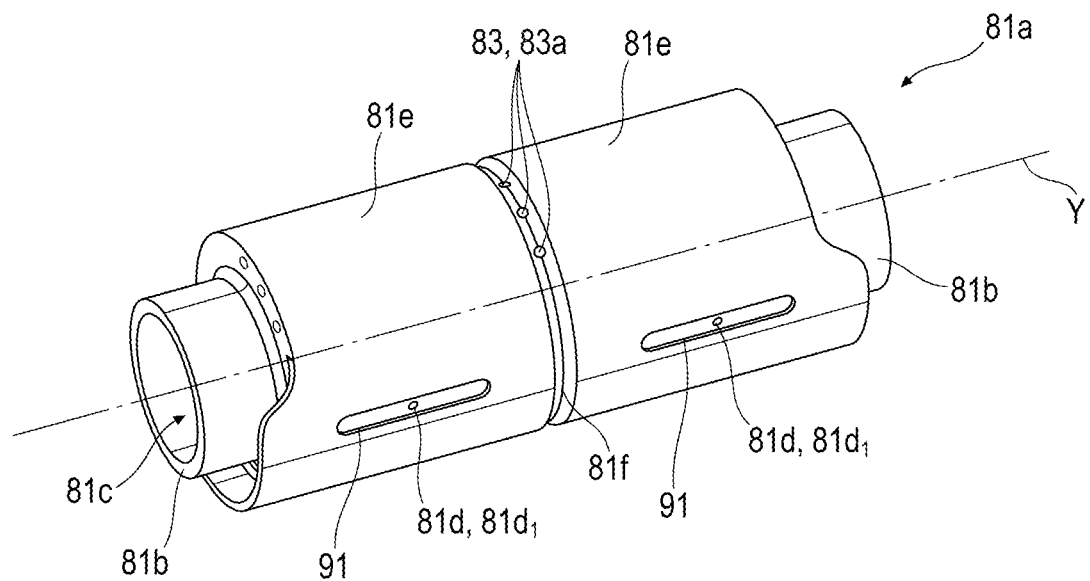

[FIG. 10]
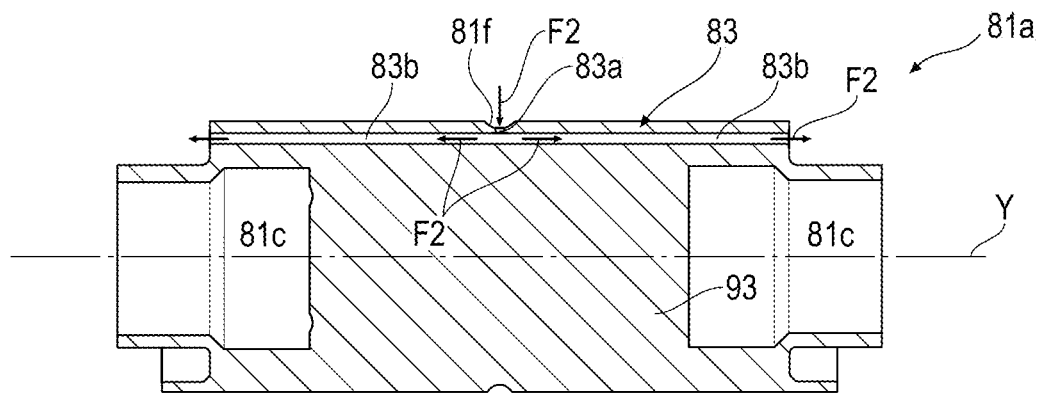
[FIG. 11]
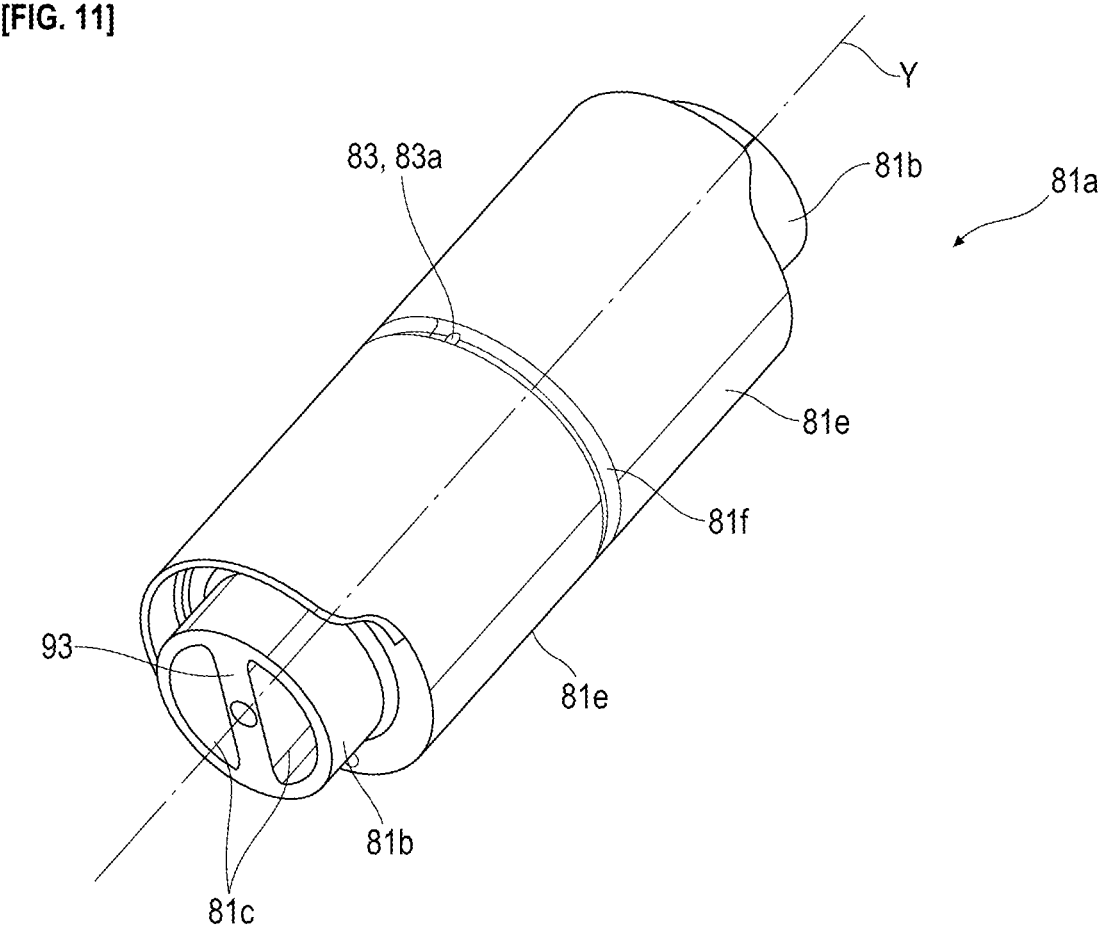

[FIG. 12]
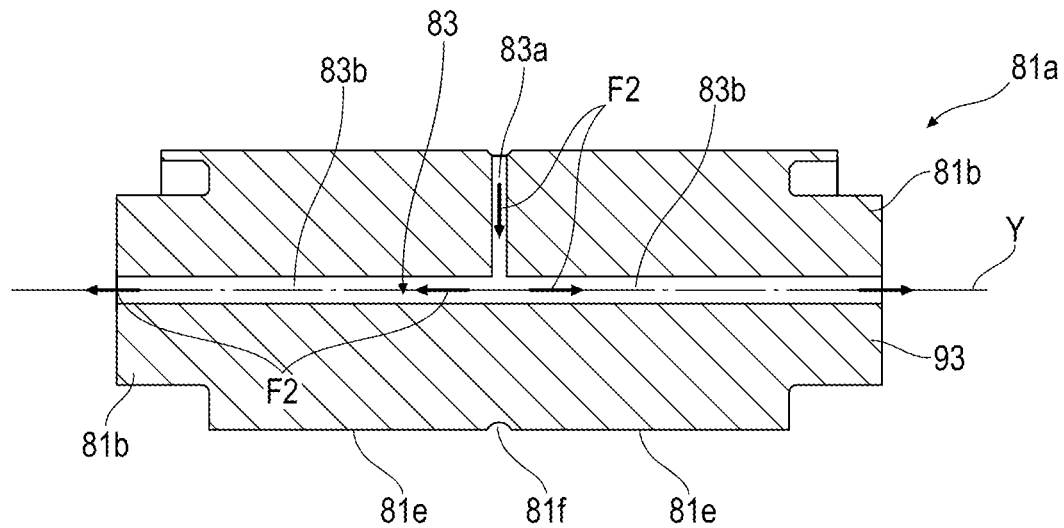
[FIG. 13]
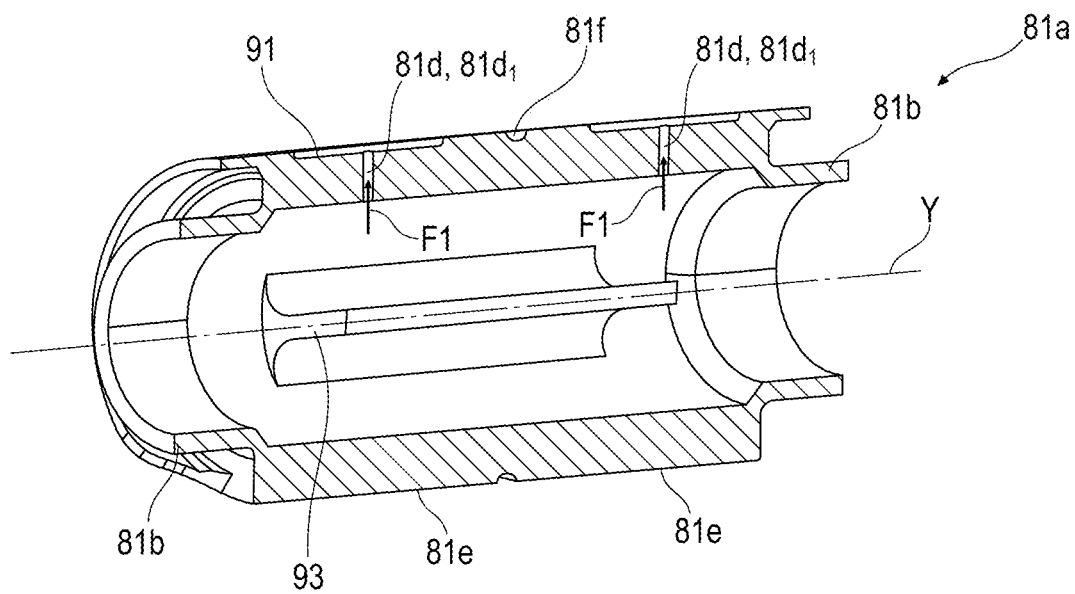

[FIG. 14]
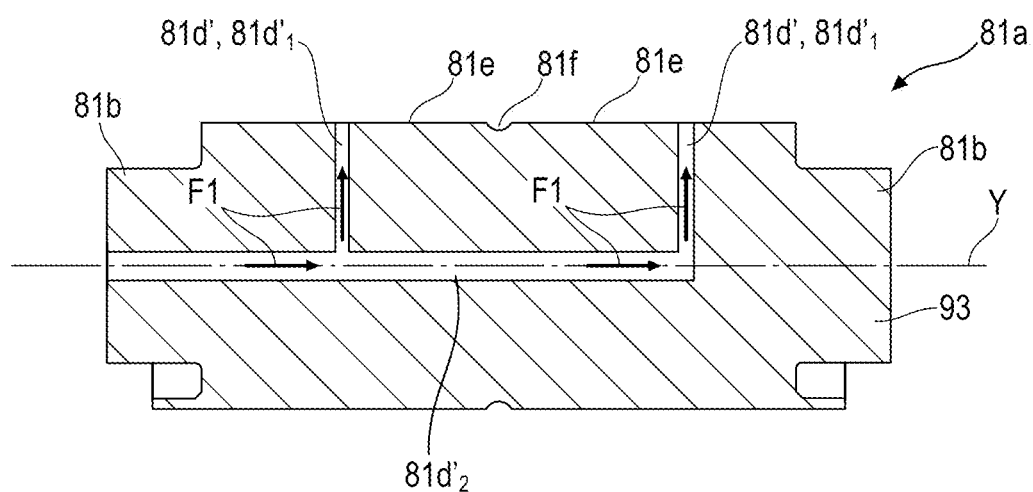
[FIG. 15]
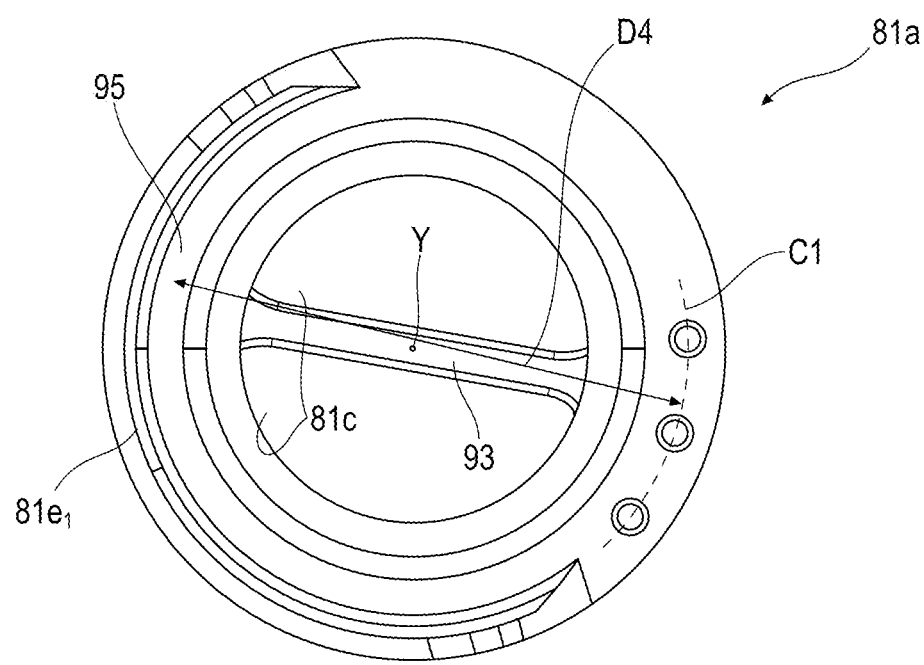

[FIG. 16]
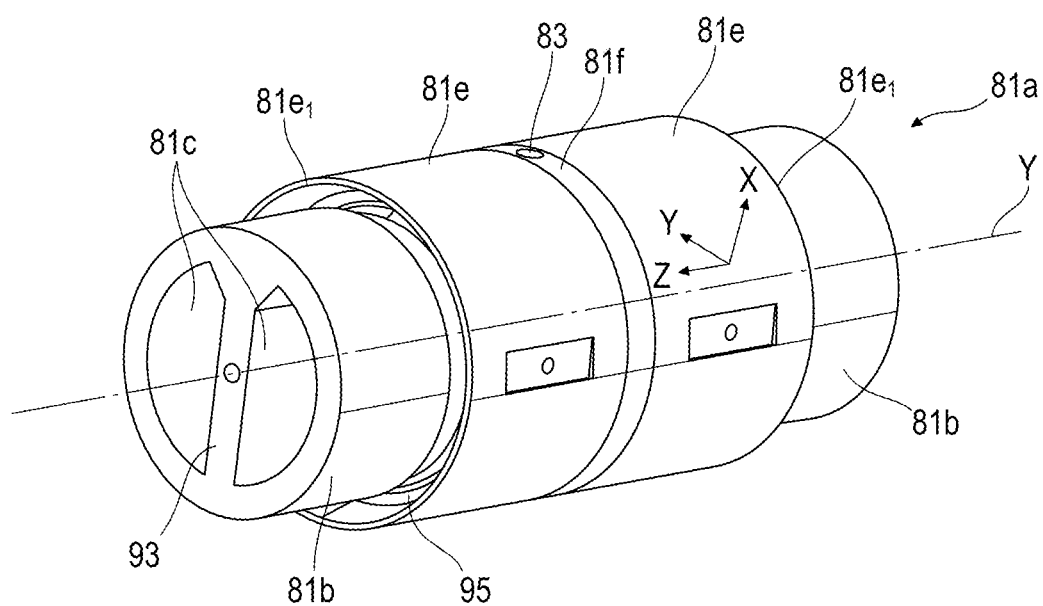
[FIG. 17]
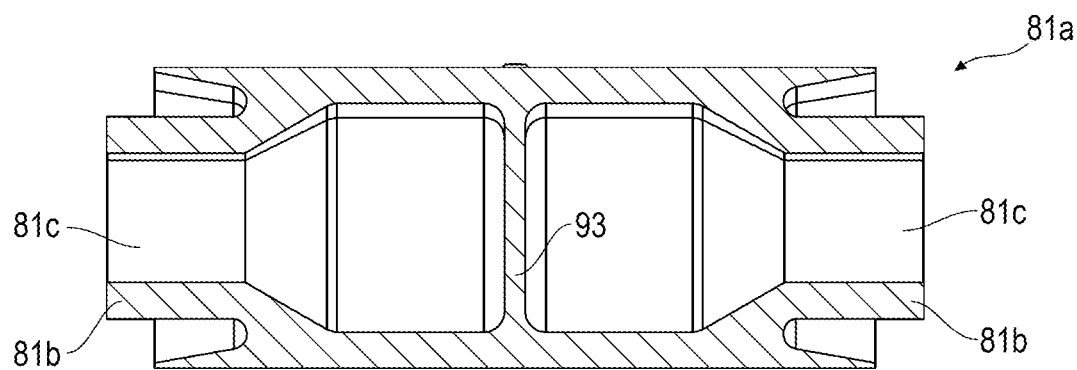

MECHANICAL REDUCER FOR AN AIRCRAFT TURBOMACHINE

TECHNICAL FIELD OF THE INVENTION

The present invention relates to the field of the mechanical reducers for turbomachines, in particular for an aircraft.

TECHNICAL BACKGROUND

The prior art comprises in particular the documents WO-A1-2010/092263, FR-A1-2 987 416, EP-A1-3 922 886, EP-A1-3 726 097, FR-A1-3 008 462 and FR-A1-3 041 054.

The role of a mechanical reducer is to modify the gear and torque ratio between the inlet shaft and the outlet shaft of a mechanical system.

The new generations of double-flow turbomachines, in particular those with a high bypass ratio, comprise a mechanical reducer to drive the shaft of a fan. The usual purpose of the reducer is to convert the rotational speed referred to as high speed of the shaft of a power turbine into a slower rotational speed for the shaft driving the fan.

Such a reducer comprises a central sprocket, referred to as sun gear, a ring gear and sprockets referred to as planet gears, which are engaged between the sun gear and the ring gear. The planet gears are held by a frame referred to as planet carrier. The sun gear, the ring gear and the planet carrier are planetary gears because their axes of revolution coincide with the longitudinal axis X of the turbomachine. The planet gears each have a different axis of revolution and are equally distributed on the same operating diameter around the axis of the planetary gears. These axes are parallel to the longitudinal axis X.

There are several reducer architectures. In the prior art of the double-flow turbomachines, the reducers are of the planetary or epicyclic type. In other similar applications, there are architectures referred to as differential or "compound".

In a planetary reducer, the planet carrier is stationary and the ring gear is the output shaft of the device which rotates in the opposite direction of the sun gear.

In an epicyclic reducer, the ring gear is stationary and the planet carrier is the output shaft of the device which rotates in the same direction as the sun gear.

On a compound reducer, no element is attached in rotation. The ring gear rotates in the opposite direction of the sun gear and the planet carrier.

The reducers can consist of one or more gearing stages. This meshing is ensured in different ways such as by contact, friction or magnetic field.

In the present application, "stage" or "toothing" means a series of meshing teeth with a series of complementary teeth. A toothing can be internal or external.

A planet gear may comprise one or two gearing stages. A single-stage planet gear comprises a toothing that can be straight, helical or herringbone, and whose teeth are located on a same diameter. This toothing cooperates with both the sun gear and the ring gear.

A double-stage planet gear comprises two toothings or two series of teeth that are located on different diameters. A first toothing cooperates with the sun gear and a second toothing cooperates with the ring gear.

In addition, each planet gear is centred and guided in rotation around an axis by a bearing which is carried by the planet carrier. There are several bearing technologies available for this application and the present application relates specifically to the use of hydrodynamic bearings for guiding the planet gears in a mechanical reducer.

In the present application, "hydrodynamic bearing" means a bearing comprising a body engaged in a planet gear and around which is located a film of oil under pressure. In the prior art, a hydrodynamic bearing of planet gear comprises a cylindrical body comprising an external cylindrical surface that extends into an internal cylindrical surface of the planet gear. The pressurised oil film is interposed between these surfaces and allows that there is no contact between these surfaces.

One of the disadvantages of this type of reducer is the relatively large axial dimension of the planet gears, which take up large loads generated by the transmission of the torque at the level of the meshing, as well as by the centrifugal effects applied to the planet gears in the case of an epicyclic reducer. The bearings that support the planet gears and guide them in rotation are therefore loaded and there is little room to integrate them without considerably increasing the overall dimension of the reducer.

Rollings with rolling-elements could be used as bearings. However, the rollings have a load capacity that does not allow them to be placed under the toothings of the planet gears, so they must be placed outside the planet gears to give them a sufficient diameter, which considerably increases the overall dimension of the reducer.

From the point of view of the overall dimension, it is therefore preferable to use plain bearings or hydrodynamic bearings which have higher load capacities. This allows the bearings to be placed under the toothings of the planet gear, i.e. in a small diameter and axially long space. A hydrodynamic bearing is usually supplied with oil from its middle and this oil is evacuated from the axial ends. It is easy to design a long bearing that extends the full length of the planet gear. Such a bearing has a higher load capacity than the minimum required and requires a high oil flow rate since this flow rate depends, among other things, on the length of the bearing. This type of bearing also generates high power losses. However, to have an efficient reducer, the required oil flow rate and the power losses must be as low as possible.

The circulation of the oil of the bearings must therefore be managed precisely, both in terms of the supply of oil to the bearings and the evacuation of this oil.

The invention thus proposes an improvement to this technology, in particular with regard to the evacuation of the operating oil from the hydrodynamic bearings, for gearing dual-stage planet gears.

SUMMARY OF THE INVENTION

The invention concerns a mechanical reducer for a turbomachine, in particular for an aircraft, this reducer comprising a mechanical reducer for a turbomachine, in particular for an aircraft, this reducer comprising:
  a sun gear with a first axis of rotation,
  a ring gear that extends around the sun gear and said first axis,
  planet gears which are meshed with the sun gear and the ring gear, each planet gear having a second axis of rotation and comprising a first toothing having a first average diameter for meshing with the sun gear, and a second toothing having a second average diameter for meshing with the ring gear, the first and second average diameters being different,
  hydrodynamic bearings for guiding the planet gears in rotation, these hydrodynamic bearings being carried by a planet carrier and comprising cylindrical bodies which are generally elongate along said second axis and which are engaged with the planet gears, each of these cylindrical bodies comprising an internal oil circulation cavity and first pipelines for conveying oil from this cavity to at least one external cylindrical surface of the body extending around said second axis, so as to form at least one oil film for guiding the planet gear mounted on this body, characterised in that each of the cylindrical bodies further comprises second oil evacuation pipelines, which are different from the first pipelines, and which extend from said at least one external cylindrical surface to at least one of the longitudinal ends of that body.

The invention thus proposes to equip each of the cylindrical bodies with two types of pipelines, namely oil supply pipelines and oil evacuation pipelines. These pipelines are independent, so the oil supply to the oil films will not interfere with the oil evacuation from these films. The oil supply is carries out from the internal cavity of each of the cylindrical bodies, and the oil evacuation is carried out at the longitudinal ends of the body and thus of the bearing.

The invention is particularly advantageous in the scope of the lubrication and, in particular, the evacuation of the lubricating oil from gearing dual-stage planet gears.

The reducer according to the invention may comprise one or more of the following characteristics, taken alone or in combination with each other:
- each of the cylindrical bodies comprises an external annular gorge which is located in said plane and which is located between two external cylindrical surfaces of the body, said second pipelines opening at the bottom of said gorge;
- the second pipelines each comprise a radial orifice formed at the bottom of the gorge, and at least one straight segment which is connected to this orifice and which extends to at least one of the longitudinal ends of the body;
  - the straight segment of each of the second pipelines is parallel to said second axis or inclined with respect to this axis;
- the straight segments of the second pipelines are located on a circumference centred on said second axis, which has a diameter greater than a maximum diameter of said cavity;
- each of the cylindrical bodies comprises an annular groove at each of its longitudinal ends, these annular grooves opening out in the axial direction and the straight segments of the second pipelines opening out at the bottom of these grooves;
- each of the cylindrical bodies comprises at least one internal stiffener in said cavity, which is parallel or perpendicular to said second axis;
- the second pipelines each comprise a radial orifice formed at the bottom of the gorge and extending to said second axis, and a straight segment which is connected to this orifice and extends to at least one of the longitudinal ends of the body;
- the radial orifice and the straight segment of each of the second pipelines are at least partly formed in said stiffener;
- said stiffener extends to the axial ends of the body; alternatively, it extends to a distance from the axial ends of the body;
- the first pipelines are symmetrical with respect to said plane so as to generate two oil films for guiding the planet gear on each body;
- each of the planet gears comprises a cylindrical sleeve which is generally elongate along said second axis and an annular web extending substantially radially outwardly from the middle of that sleeve, the teeth of the second toothing being located at the axial ends of the sleeve, and the teeth of the first toothing being located at the external periphery of the web;
- the sleeve comprises two internal cylindrical guiding surfaces separated from each other by an internal annular gorge located substantially in said plane;
- the sleeve comprises oil evacuation pipelines each comprising a radial orifice formed at the bottom of the gorge, and at least one straight segment which is connected to this orifice and extends to at least one of the longitudinal ends of the sleeve;
- the sleeve comprises a cylindrical bore at each of its longitudinal ends, these bores being symmetrical with respect to said plane and comprising an internal diameter which is greater than the internal diameter of said internal cylindrical surfaces;
- the straight segments of the pipelines are located on a circumference centred on said second axis, which has a diameter greater than the internal diameter of the internal cylindrical surfaces and less than said second average diameter;
- the two series of teeth of the second toothing are arranged around said bores respectively;
- each of the planet gears is guided by two hydrodynamic bearings independent of each other and arranged on either side of said plane;
  - said two hydrodynamic bearings are located respectively in line with the series of teeth of the second toothing;
  - each of the planet gears is passed through by a single cylindrical body defining said two hydrodynamic bearings;
  - the first toothing comprises a single series of teeth; alternatively, the first toothing comprises two series of teeth which are arranged on either side of said plane;
  - the second toothing comprises two series of teeth which are arranged on either side of said plane and of the first toothing;
  - the first and second toothings of each planet gear are symmetrical with respect to a plane perpendicular to said first axis and passing substantially through the middle of the planet gear.

The present invention also relates to a mechanical reducer for a turbomachine, in particular for an aircraft, this reducer comprising:
- a sun gear with a first axis of rotation,
- a ring gear that extends around the sun gear and said first axis,
- planet gears which are meshed with the sun gear and the ring gear, each planet gear having a second axis of rotation and comprising a first toothing having a first average diameter for meshing with the sun gear, and a second toothing having a second average diameter for meshing with the ring gear, the first and second average diameters being different each of the planet gears comprising a cylindrical sleeve which is generally elongated along said second axis and an annular web extending substantially radially outwardly from the middle of that sleeve, teeth of the second toothing being located at the axial ends of the sleeve, and teeth of the first toothing being located at the external periphery of the web, hydrodynamic bearings for guiding the planet gears in rotation, these hydrodynamic bearings being carried by a planet carrier and comprising cylindrical bodies which are generally elongated along said second axis and which are engaged in the planet gears, each of these cylindrical bodies comprising an internal oil circulation cavity and first oil pipelines for conveying oil from this cavity to at least one external cylindrical surface of the body, said at least one external cylindrical surface of the body extending around said second axis and into at least one internal cylindrical surface of the sleeve of the planet gear mounted around that body, so as to form at least one oil film for guiding the planet gear mounted on that body, characterised in that the sleeve of each of the planet gears comprises oil evacuation pipelines extending from said at least one internal cylindrical surface of the sleeve to at least one of the longitudinal ends of this sleeve.

Advantageously, the first and second toothings of each planet gear are symmetrical with respect to a plane perpendicular to said first axis and passing substantially through the middle of the planet gear, The invention also relates to a turbomachine, in particular for an aircraft, comprising a mechanical reducer as described above.

BRIEF DESCRIPTION OF THE FIGURES

Further characteristics and advantages will be apparent from the following description of a non-limiting embodiment of the invention with reference to the appended drawings in which:

FIG. 1 is a schematic axial sectional view of a turbomachine using the invention, FIG. 2 is a partial axial sectional view of a mechanical reducer, FIG. 3 is another partial axial sectional view of a mechanical reducer, and illustrates the prior art of the present invention, FIG. 4 is a schematic axial cross-sectional and perspective view of a symmetrical gearing dual-stage reducer, and also illustrates the prior art of the present invention, FIG. 5 is another schematic axial section view of the reducer in FIG. 4;

FIG. 6 is a schematic axial sectional view of a planet gear and a cylindrical hydrodynamic bearing body, for a reducer according to one embodiment of the invention, FIG. 7 is a schematic axial sectional view of a planet gear according to an alternative embodiment of the invention, FIG. 8 is a schematic perspective view of the planet gear in FIG. 7, FIG. 9 is a schematic perspective view of a cylindrical hydrodynamic bearing body according to an alternative embodiment of the invention, FIG. 10 is a schematic cross-section of the body in FIG. 9, FIG. 11 is a schematic perspective view of a cylindrical hydrodynamic bearing body according to an alternative embodiment of the invention, FIG. 12 is a schematic cross-section of the body in FIG. 11, FIG. 13 is a schematic perspective view of a cylindrical hydrodynamic bearing body according to an alternative embodiment of the invention, FIG. 14 is a schematic cross-section of the body in FIG. 13, FIG. 15 is a schematic side view of a cylindrical hydrodynamic bearing body according to an alternative embodiment of the invention FIG. 16 is a schematic perspective view of a cylindrical hydrodynamic bearing body according to an embodiment of the invention, and FIG. 17 is a schematic cross-sectional view of a cylindrical hydrodynamic bearing body according to an alternative embodiment of the invention.

DETAILED DESCRIPTION OF THE INVENTION

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven by the LP shaft 3 by means of a reducer 6. This reducer 6 is generally of the planetary or epicyclic type.

The following description relates to a reducer of the epicyclic type, in which the planet carrier and the sun gear are rotatable, the ring gear of the reducer being stationary in the reference frame of the engine.

The reducer 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the reducer 6. This enclosure E is here closed upstream by joints at the level of a bearing allowing the passage of the fan shaft 4, and downstream by joints at the level of the passage of the LP shaft 3.

FIG. 2 shows an epicyclic reducer 6. In the inlet, the reducer 6 is connected to the LP shaft 3, for example by means of internal splines 7a. Thus the LP shaft 3 drives a planetary sprocket referred to as the sun gear 7. Classically, the sun gear 7, whose axis of rotation is coincident with that of the turbomachine X, drives a series of sprockets referred to as planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of the planet gears 8 is held by a frame referred to as planet carrier 10. Each planet gear 8 rotates around its own axis Y, and meshes with the ring gear 9.

In the output we have:

In this epicyclic configuration, the assembly of planet gears 8 drives the planet carrier 10 in rotation about the axis X of the turbomachine. The ring gear is attached to the engine casing or stator 5 via a ring gear carrier 12 and the planet carrier 10 is attached to the fan shaft 4.

In another planetary configuration, the assembly of the planet gears 8 is held by a planet carrier 10 which is attached to the engine casing or stator 5. Each planet gear 8 drives the ring gear which is fitted to the fan shaft 4 via a ring gear carrier 12.

In another differential configuration, the assembly of the planet gears 8 is held by a planet carrier 10 which is connected to a first fan shaft 5. Each planet gear 8 drives the ring gear which is fitted to a second counter-rotating fan shaft 4 via a ring gear carrier 12.

Each planet gear 8 is mounted free in rotation by means of a bearing 11, for example of the rolling bearing or hydrodynamic bearing type. Each bearing 11 is mounted on one of the axles 10b of the planet carrier 10 and all axles are positioned relative to each other using one or more structural frame 10a of the planet carrier 10. There are a number of axles 10b and bearings 11 equal to the number of planet gears. For reasons of operation, mounting, manufacture, inspection, repair or replacement, the axles 10b and the frame 10a can be separated into several parts.

For the same reasons mentioned above, the toothing of a planet gear can be separated into several propellers or teeth each with a median plane P, P'. In our example, we detail the operation of a reducer in which each planet gear comprises two series of herringbone teeth cooperating with a ring gear separated into two half-ring gears:

an upstream half-ring gear 9a consisting of a rim 9aa and an attachment half-flange 9ab. On the rim 9aa is the front propeller meshed with a propeller of the toothing 8d of each planet gear 8. The propeller of the toothing 8d also meshes with that of the sun gear 7.

a downstream half-ring gear 9b consisting of a rim 9ba and an attachment half-flange 9bb. On the rim 9ba is the rear propeller meshed with a propeller of the toothing 8d of each planet gear 8. The propeller of the toothing 8d also meshes with that of the sun gear 7.

If the propeller widths vary between the sun gear 7, the planet gears 8 and the ring gear 9 because of the toothing overlaps, they are all centred on a median plane P for the upstream teeth and on another median plane P' for the downstream teeth.

FIG. 2 thus illustrates the case of a gearing single-stage reducer 6, i.e. a same toothing 8d of each planet gear 8 cooperates with both the sun gear 7 and the ring gear 9. Even though the toothing 8d comprises two series of teeth, these teeth have the same average diameter and form a single toothing referred to as herringbone.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the conveying of the oil in the reducer 6. The oil enters the reducer 6 from the stator portion 5 into a dispenser 13 by different means which will not be specified in this view because they are specific to one or more types of architecture. The dispenser 13 comprises injectors 13a and arms 13b. The function of the injectors 13a is to lubricate the toothings and the function of the arms 13b is to lubricate the bearings. The oil is fed towards the injector 13a and exits through the end 13c to lubricate the toothings. The oil is also fed towards the arm 13b and circulates through the supply opening 13d of the bearing. The oil then circulates through the axle into one or more buffer areas 10c and out through the orifices 10d in order to lubricate the bearings of the planet gears.

FIG. 3 shows another example of a reducer architecture, referred to as a gearing dual-stage, in which each planet gear 8 comprises two separate toothings 8d1, 8d2 configured to cooperate respectively with the ring gear 9 and the sun gear 7.

In this FIG. 3, the elements already described in the foregoing are designated by the same references.

The toothing 8d1 meshing with the ring gear 9 has an average diameter noted D2 and is located in a median plane P. The toothing 8d2 meshing with the sun gear 7 has an average diameter noted D1 and is located in another median plane P'. The median planes P, P' are parallel to each other and perpendicular to the axis X. The diameter D2 is smaller than the diameter D1. Finally, each toothing 8d1, 8d2 comprises a single propeller.

As mentioned above, this "dual-stage" architecture generates significant moments at the level of the planet gears 8 in particular because this dual-stage has asymmetrical toothing.

FIGS. 4 and 5 show a reducer 60 with symmetrical double toothing, which allows to solve the above problem.

This reducer 60 comprises:

a sun gear 70 having an axis of rotation X, a ring gear 90 which extends around the sun gear and which is configured to be rotationally immovable about the axis X, and planet gears 80 which are meshed with the sun gear 70 and the ring gear 90 and which are held by a planet carrier 100 which is configured to be movable in rotation about the axis X.

The plane H is defined as a median plane perpendicular to the axis X and passing substantially through the middle of the reducer 60 (FIG. 5).

The sun gear 70 comprises internal splines 70a for coupling with the LP shaft 30 as well as an external toothing 70b for meshing with the planet gears 80. The toothing 70b have two series of adjacent herringbone teeth, separated from each other by a radially outwardly oriented annular groove 72. The toothing 70b is symmetrical with respect to the plane H, its teeth being located on either side of the plane H which passes through the groove 72.

The ring gear 90 is formed by two independent annulus 90a, 90b and comprises a toothing which is separated into two series of herringbone teeth 90d1, 90d2 carried respectively by the two annulus.

The annulus 90a, 90b are arranged symmetrically with respect to the plane H which thus extends between these annulus. The annulus are connected and attached to a ring gear carrier 120 by means of annular connecting flasks 122. The flasks 122 are independent of each other, each flask having a general S-shape in axial half-section providing it with a certain radial flexibility by elastic deformation during operation.

Each annulus 90a, 90b extends around the axis X and is attached to the corresponding flask 122 by its external periphery. Its internal periphery comprises one of the teeth 90d1, 90d2.

The ring gear carrier 120 has a generally annular shape about the axis X and more particularly is biconical. It thus comprises a first upstream or left-hand stretch in the drawing, with an upstream end of smaller diameter, and a downstream end of larger diameter which is connected to the upstream end of larger diameter of the other, downstream or right-hand stretch in the drawing. The larger diameter ends of the stretches are therefore connected to each other, and their smaller diameter ends form the axial ends of the ring gear carrier.

The upstream end of the ring gear carrier 120 extends around the planet carrier 100 or a shaft connected to the planet carrier, and is centred and guided in rotation on the planet carrier or the shaft by means of at least one bearing 124. Similarly, the downstream end of the ring gear carrier 120 extends around the planet carrier 100 or a shaft connected to this planet carrier, and is centred and guided in rotation on the planet carrier or the shaft by means of at least one further bearing 126.

As in the case of the ring gear 90, the ring gear carrier 120 is symmetrical with respect to the plane H which intersects the ring gear carrier in its middle and thus passes through the ends of the larger diameter of the aforementioned stretches.

Each planet gear 80 comprises a first toothing 82 of average diameter D1 for meshing with the sun gear 70, and a second toothing 84 of average diameter D2, different from D1 and in particular smaller than D1, for meshing with the ring gear 90. The average diameters are measured from the axis Y of each planet gear and are each the average of the maximum diameter and the minimum diameter of a toothing of that planet gear.

Each planet gear 80 comprises a cylindrical sleeve 86 and an annular web 88 extending substantially radially outwardly from the middle of this sleeve 86. The toothing 84 is separated into two series of herringbone teeth 84d1, 84d2 which are located respectively on the axial ends of the sleeve 86. In the example shown, which is not limiting, the toothing 82 comprise two series of herringbone-shaped teeth 82d1, 82d2 which are located at the external periphery of the web 88 and which are separated from each other by an annular groove 89 opening radially outwards with respect to the axis Y. Alternatively, the toothing 82 could comprise a single series of teeth, thus without interruption and without groove.

The toothing 82 is passed through in its middle by the plane H which passes through the groove 89, the teeth 82d1, 82d2 being thus arranged on either side of the plane H. The teeth 84d1, 84d2 are also arranged symmetrically with respect to the plane H.

The toothing 82 and the external periphery of the web 88 have an axial dimension which is less than the axial distance between the annulus 90a, 90b as well as between the flasks 122, so that each planet gear 80 can rotate freely in the ring gear carrier 120 and between the annulus 90a, 90b and the flasks 122.

Each of the planet gears 80 is guided in rotation by a hydrodynamic bearing 81 which comprises a cylindrical body 81a which passes through the planet gear 80, and in particular its sleeve 86, and which is configured to form a guiding oil film inside the planet gear.

The body 81a of a bearing 26 extends along the axis Y and comprises at its longitudinal ends extensions 81b housed in orifices forming seats of the planet carrier 100.

The body 81a is generally tubular and comprises an internal oil circulation cavity which generally communicates with first oil fed pipelines to an external cylindrical surface of the body 81a for the formation of the oil film between that surface and an internal cylindrical surface of the planet gear 80.

In the example shown in FIG. 5, which illustrates the prior art, the hydrodynamic bearing and the oil film extend over the entire length or axial dimension of the planet gear 80, and oil from this bearing is evacuated via the axial ends of this oil film (i.e. between the axial ends of the cylindrical surfaces of the planet gear 80 and the body 81a).

The present invention proposes an improvement to this technology, several embodiments of which are shown in FIG. 6 and following.

The reducer 60 according to the invention comprises all the characteristics described in the foregoing in relation to FIGS. 3, 4 and 5 insofar as they are not contrary to or do not contradict the following.

The references used in FIG. 6 and following and already used in FIGS. 3, 4 and 5 therefore designate identical or similar elements.

The planet gear 80 is of the gearing dual-stage type and comprises a tubular sleeve 86 connected by a web 88 to a first external toothing 82, the sleeve 86 being itself equipped with a second toothing 84.

The first toothing 82 has an average diameter D1 and meshes with the aforementioned sun gear 70, and the second toothing 84 has an average diameter D2, different from D1 and in particular smaller than D1, and meshes with the aforementioned ring gear 90. The average diameters D1 and D2 are measured from the axis Y of each planet gear 80 and are each the average of the maximum diameter and the minimum diameter of a toothing of that planet gear.

The toothing 84 is separated into two series of teeth 84d1, 84d2, for example herringbone or straight, which are located respectively on the axial ends of the sleeve 86. The toothing 82 comprises two series of teeth 82d1, 82d2, for example also herringbone or straight, which are located at the external periphery of the web 88 and which are separated from each other by an annular groove 89 opening radially outwards with respect to the axis Y.

The toothing 82 are passed through in its middle by the plane H which passes through the groove 89, the teeth 82d1, 82d2 being thus arranged on either side of the plane H. The teeth 84d1, 84d2 are also arranged symmetrically with respect to the plane H, on either side of the teeth 82d1, 82d2.

The following description relates to one planet gear 80 and its hydrodynamic guiding bearings 81, but is understood to apply to the assembly of the planet gears 80 and hydrodynamic bearings 81 in the reducer 60.

In the example shown, each of the planet gears 80 is guided in rotation by two hydrodynamic bearings 81 which are formed by a cylindrical body 81a which passes through the planet gear 80, and in particular its sleeve 86, and which is configured to form two guiding oil films H1, H2 inside the planet gear 80.

The sleeve 86 comprises two internal cylindrical surfaces 86a, 86b which extend around the axis Y and are symmetrical with respect to the plane H. These surfaces 86a, 86b are intended to delimit outwardly and respectively the two oil films H, H2.

The surfaces 86a, 86b are separated from each other by an annular gorge 86c which opens radially inwardly with respect to the axis Y. In the example shown, this gorge is generally C- or U-shaped in cross-section, but other shapes are also compatible with this invention. The gorge 86c is located in the H-plane and thus in line with the web 88. This gorge 86 allows for flexibility in the planet gear 80.

The sleeve 86 further comprises a generally cylindrical internal bore 86d at each of its axial or longitudinal ends. These bores 86d allow for example to lighten the planet gear 80.

Each of the surfaces 86a, 86b extends axially from the gorge 86c to one of these bores 86d. Furthermore, as can be seen in the drawings, the surfaces 86a, 86b extend partly within the series of teeth 82d1, 82d2 of the first toothing 82.

Each surface 86a, 86b has a length L3 which is greater than the length of each of the series of teeth 82d1, 82d2, 84d1, 84d2. The surfaces 86a, 86b have an internal diameter D5, which is smaller than the internal diameter D6 of the bores 86d. The internal diameter D6 of these bores 86d is smaller than the average diameter D2 of the second toothing 85. Furthermore, as can be seen in the drawings, the bores 86d extend partly within the series of teeth of the second toothing 84.

This configuration of the planet gear 80 allows to reduce its mass while facilitating the oil circulation.

FIGS. 7 and 8 show that the planet gear 80 comprises oil evacuation pipelines 87 from the surfaces 86*a*, 86*b* to its longitudinal ends. These pipelines 87 are formed in the sleeve 86 and each comprise a radial orifice 87*a* and at least one straight segment 87*b*.

The radial orifice 87*a* of each of the pipelines 87 is formed at the bottom of the gorge 86*c*. The radial orifices 87*a* are preferably evenly spaced around the axis Y. Each orifice 87*a* is connected to the middle of a straight segment 87*b* which extends axially between the two axial ends of the sleeve 86 and opens, for example, at the level of the aforementioned bores 86*d*. Alternatively, each orifice 87*a* is connected to the ends of two straight segments 87*b* which extend from both sides of the gorge 86*c* and each join one of the two axial ends of the sleeve 86, for example at the level of one of the bores 86*d*. The segments 87*b* may be parallel to each other and to the axis Y.

The straight segments 87*b* are located on a circumference C2 centred on the axis Y which has a diameter D7. This diameter D7 is larger than D5 and smaller than D6 and D2.

The arrows F1 in FIG. 7 show the circulation of the oil through these pipelines 87, and thus illustrate the evacuation of oil by means of one of the planet gears 80.

Several alternative embodiments of the hydrodynamic bearings 81 and in particular of the cylindrical body 81*a*, which may be associated with the planet gear 80 of FIGS. 6 to 8 or with a different dual-stage planet gear, will now be described.

The body 81*a* extends along the axis Y and comprises at its longitudinal ends extensions 81*b* housed in orifices forming seats of the planet carrier 100. As can be seen in FIG. 6, these extensions 81*b* may be partly housed in the bores 86*d* of the sleeve 86.

The body 81*a* is generally tubular and comprises an internal oil circulation cavity 81*c* which communicates with oil fed pipelines 81*d* to external cylindrical surfaces 81*e* of the body 81*a* for the formation of the two oil films H1, H2 between these surfaces 81*e* and the internal cylindrical surfaces 86*a*, 86*b* of the sleeve 86 of the planet gear 80.

The surfaces 81*e* are axially spaced apart and separated from each other by an annular gorge 81*f* which is located at the level of the plane H and opens radially outwardly with respect to said axis Y. The surfaces 81*e* have a diameter D3.

Each of the surfaces 81*e* has a length L2 which is equal to the length L3 of each of the surfaces 86*a*, 86*b*.

The surfaces 81*f* extend into surfaces 86*a*, 86*b* to define the two oil films H1, H2. The diameters D3 and D5 are therefore relatively close and determined to allow the formation of oil films of predetermined thickness between them.

The two pressurised oil films H1, H2 are axially spaced and independent of each other, in particular because they are supplied by different pipelines 81*d*.

In addition, the cylindrical body 81*a* of each of the planet gears 80 comprises pipelines 83 for evacuating the oil from the films H1, H2.

In the embodiment shown in FIGS. 9 and 10, the pipelines 81*d* comprise radial orifices 81*d*1 which open at their radially external ends onto the surfaces 81*e* and more precisely into bathtubs 91 formed on these surfaces 81*e*. Each of the bathtubs 91 is elongated in the axial direction and extends over more than half the length L2 of the surface 81*e*. At least one radial orifice 81*d*1 is formed at the bottom of this bathtub 91, substantially in its middle. The radial orifices 81*d*1 may open directly into the internal cavity 81*c* at their radially internal ends.

In the example shown, the body 81*a* comprises an internal stiffener 93 in the cavity 81*c*, which is formed in one-piece with the body. Although not shown in the drawings, the orifices 81*d*1 may be connected to the internal cavity 81*c* of the body, separated into two portions by the stiffener 93, by segments formed in the stiffener 93 and opening into each of these portions of the cavity 81*c*.

The pipelines 83 comprise radial orifices 83*a* which are formed in the gorge 86*c* and are connected to straight segments 83*b* which extend to the axial ends of the body 81*a*.

The orifices 83*a* may be evenly spaced around the axis Y or grouped together in a particular angular sector of the body 81*a*, as shown in the drawing. Each orifice 83*a* is connected to the middle of a straight segment 83*b* which extends axially between the two axial ends of the body 81*a*. Alternatively, each orifice 83*a* is connected to the ends of two straight segment 83*b* which extend from both sides of the gorge 81*f* and each join one of the axial ends of the body 81*a*. The segments 87*b* may be parallel to each other and to the axis Y.

The arrows F2 in FIG. 10 show the circulation of the oil through these pipelines 87, and thus illustrate the evacuation of oil by means of one of the bodies 81*a*.

FIGS. 11 and 12 show an alternative embodiment of the body 81*a*, which differs from the previous embodiment essentially in that the stiffener 93 has a generally flat shape and extends parallel to the axis Y. The stiffener 93 extends along the entire axial dimension of the body 81*a* and thus between the two extensions 81*b*.

The oil evacuation pipelines 87 of the films H1, H2 are partly formed in this stiffener 93. The straight segment or segments 87*b* are aligned along the axis Y and extend along the entire length of the stiffener 93 and thus the entire axial dimension of the body 81*a*. The radial orifice or orifices 87*a* have their radially external ends opening into the bottom of the gorge 81*f* and their radially internal ends connected to the straight segment or segments 87*b*.

The arrows F2 in FIG. 12 show the circulation of the oil through these pipelines, and thus illustrate the evacuation of oil by means of one of the bodies 81*a*.

FIGS. 13 and 14 show an alternative embodiment of the body 81*a*, which differs from the embodiment of FIGS. 9 and 10 essentially in that the stiffener 93 is generally flat in shape and extends parallel to the axis Y. The stiffener 93 extends over only one portion or the entire axial dimension of the body.

In addition to the pipelines 81*d* which supply oil to the bathtubs, the body may comprise further supply pipelines 81*d'* which are formed at least partly in the stiffener 93. These pipelines 81*d'* comprise radial orifices 81*d'*1 which extend from the cylindrical surfaces 81*e* of the body 81*a* to the axis Y to be connected with one or more straight segments 81*d'*2 which are formed in the stiffener 93 and extend to at least one of the axial ends of the stiffener and the body 81*a* (FIG. 14).

The arrows F1 in FIGS. 13 and 14 show the oil supply through these pipelines 81*c*1'.

FIGS. 15 to 17 show other alternative embodiments for a body 81*a*. FIGS. 15 and 16 show, for example, that each of the cylindrical surfaces 81*e* of the body 81*a* extends to the side of an extension 81*b* to form a cylindrical wall 81*e*1. The cylindrical body 81*a* may comprise an annular groove 95 at each of its longitudinal ends, which opens in the axial direction and is outwardly delimited by this cylindrical wall 81e1. This cylindrical wall 81e1 may extend continuously over 360° around the axis Y, as in FIG. 15, or over a smaller angle—which is between 180 and 220° in the case of FIG. 15.

Furthermore, in FIG. 16, the straight segments 87b of the pipelines 87 are located on the axis Y. In FIG. 15, these straight segments 87b are located on a circumference C1 centred on the axis Y which has a diameter D4, this diameter D4 is smaller than the diameters D3 and D5, the diameter D3 being equivalent to the external diameter of the wall 81e1.

FIG. 17 illustrates a further embodiment in which the stiffener 93 is flat but extends perpendicular to the axis Y. At least some of the aforementioned pipelines 87, 81d, 81d' may be formed in this stiffener 93.

In general, the invention allows to result in a reducer 60 that has a small overall dimension, a low mass, a good reliability, a good efficiency and sufficient oil flow rate.

The invention further provides the following advantages with respect to the bearings 81 and the planet gears 80:
improved oil evacuation and geometric improvement of the bearings,
better behaviour of the bearings in misalignment,
adapted stiffness of the bearings to reduce the mass while remaining able to take up the same load,
lightening of the planet gears thanks to the pipelines in particular, and
flexibility of the planet gears due to the internal annular gorge.

The invention claimed is:

1. A mechanical reducer for a turbomachine, said mechanical reducer comprising:
a sun gear having a first axis of rotation,
a ring gear extending around the sun gear and said first axis,
planet gears which are meshed with the sun gear and the ring gear, each planet gear having a second axis of rotation and comprising a first toothing having a first average diameter for meshing with the sun gear, and a second toothing having a second average diameter for meshing with the ring gear, the first and second average diameters being different,
hydrodynamic bearings for guiding the planet gears in rotation, these hydrodynamic bearings being carried by a planet carrier and comprising cylindrical bodies which have a generally elongated shape along said second axis and which are engaged in the planet gears, each of these cylindrical bodies comprising an internal oil circulation cavity and first pipelines for conveying oil from this cavity to at least one external cylindrical surface of the body extending around said second axis, so as to form at least one oil film for guiding the planet gear mounted on this body,
wherein each of the cylindrical bodies further comprises second oil evacuation pipelines, which are different from the first pipelines, and which extend from said at least one external cylindrical surface to at least one of the longitudinal ends of that body.

2. The mechanical reducer according to claim 1, wherein each of the cylindrical bodies comprises an external annular gorge which is located in said plane and which is located between two external cylindrical surfaces of the body, said second pipelines opening at the bottom of said gorge.

3. The mechanical reducer according to claim 2, wherein the second pipelines each comprise a radial orifice formed at the bottom of the gorge, and at least one straight segment which is connected to this orifice and which extends to at least one of the longitudinal ends of the body.

4. The mechanical reducer as claimed in claim 2, wherein a straight segment of each of the second pipelines is parallel to said second axis or inclined to this axis.

5. The mechanical reducer according to claim 3, wherein the straight segments of the second pipelines are located on a circumference centred on said second axis, which has a diameter greater than a maximum diameter of said cavity.

6. The mechanical reducer according to claim 3, wherein each of the cylindrical bodies comprises an annular groove at each of its longitudinal ends, these annular grooves opening out in the axial direction and the straight segments of the second pipelines opening out at the bottom of these grooves.

7. The mechanical reducer according to claim 1, wherein each of the cylindrical bodies comprises at least one internal stiffener in said cavity, which is parallel or perpendicular to said second axis.

8. The mechanical reducer according to claim 2, wherein the second pipelines each comprise a radial orifice formed at the bottom of the gorge and extending to said second axis, and a straight segment which is connected to this orifice and extends to at least one of the longitudinal ends of the body.

9. The mechanical reducer according to claim 8, wherein each of the cylindrical bodies comprises at least one internal stiffener in said cavity, which is parallel or perpendicular to said second axis, and wherein the radial orifice and the straight segment of each of the second pipelines are at least partly formed in said stiffener.

10. The mechanical reducer according to claim 1, wherein the first pipelines are symmetrical with respect to said plane so as to generate two oil films for guiding the planet gear on each body.

11. The mechanical reducer according to claim 1, wherein each of the planet gears comprises a cylindrical sleeve which is generally elongate along said second axis and an annular web extending substantially radially outwardly from the middle of that sleeve, teeth of the second toothing being located at the axial ends of the sleeve, and teeth of the first toothing being located at the external periphery of the web.

12. The mechanical reducer according to claim 1, wherein the sleeve comprises two internal cylindrical guiding surfaces separated from each other by an internal annular gorge located substantially in said plane.

13. The mechanical reducer according to claim 12, wherein the sleeve comprises oil evacuation pipelines which each comprise a radial orifice formed at the bottom of the gorge, and at least one straight segment which is connected to this orifice and extends to at least one of the longitudinal ends of the sleeve.

14. The mechanical reducer according to claim 12, wherein the sleeve comprises a cylindrical bore at each of its longitudinal ends, these bores being symmetrical with respect to said plane and comprising an internal diameter which is greater than the internal diameter of said internal cylindrical surfaces.

15. The mechanical reducer according to claim 14, wherein the sleeve comprises oil evacuation pipelines which each comprise a radial orifice formed at the bottom of the gorge, and at least one straight segment which is connected to this orifice and extends to at least one of the longitudinal ends of the sleeve, and wherein the straight segments of the pipelines are located on a circumference centred on said second axis, which has a diameter greater than the internal diameter of the internal cylindrical surfaces and less than said second average diameter.

16. The mechanical reducer according to claim 14, wherein two series of teeth of the second toothing are arranged respectively around said bores.

17. The mechanical reducer according to claim 1, wherein each of the planet gears is guided by two hydrodynamic bearings independent of each other and arranged on either side of said plane.

18. A turbomachine for an aircraft, said turbomachine comprising a mechanical reducer according to claim 1.

* * * * *